United States Patent

[11] 3,578,168

| | | |
|---|---|---|
| [72] | Inventor | Whitney I. Grant<br>Muskego, Wis. |
| [21] | Appl. No. | 836,390 |
| [22] | Filed | June 25, 1969 |
| [45] | Patented | May 11, 1971 |
| [73] | Assignee | Vilter Manufacturing Corporation<br>Milwaukee, Wis. |

[54] REFRIGERATING APPARATUS HAVING OIL-SEPARATING MEANS
6 Claims, 3 Drawing Figs.

[52] U.S. Cl. ................................................ 210/167,
210/487
[51] Int. Cl. ........................................... B01d 50/00
[50] Field of Search ................................. 210/167,
489, 492, 494; 55/185, 486, (Agg), 520, 487, 330;
62/473

[56] References Cited
UNITED STATES PATENTS
| | | | |
|---|---|---|---|
| 1,463,990 | 8/1923 | Wilson .......................... | 55/(Agg) |
| 3,283,532 | 11/1966 | Kochev ......................... | 62/473 |

FOREIGN PATENTS
| | | | |
|---|---|---|---|
| 256,367 | 8/1926 | Great Britain................ | 55/486 |

*Primary Examiner*—Reuben Friedman
*Assistant Examiner*—T. A. Granger
*Attorney*—James E. Nilles ABSTRACT: A refrigerating system having a compressor which delivers refrigerant to a condenser and an oil separator is interposed between the compressor and condenser. The oil separator includes a layer of asbestos and a screen mesh layer, the mesh layer functioning as a channel or path in which the oil can flow downwardly by gravity to thereby be separated from the vapor.

Patented May 11, 1971

3,578,168

INVENTOR:
W. I. GRANT

BY:
James E. Nilles
ATTORNEY

REFRIGERATING APPARATUS HAVING OIL-SEPARATING MEANS

BACKGROUND OF THE INVENTION

This invention pertains to refrigerating equipment which includes a compressor and a condenser, and more particularly pertains to oil separators which are positioned between the condenser and separator.

The present invention is in the nature of an improvement over the oil separators shown in the U.S. Pat. No. 3,283,532, issued Nov. 8, 1966 and entitled "Refrigerating Apparatus with Oil Separating Means." That patent disclosed oil filters located within an oil separator. While that device did work satisfactorily, the oil filters shown in that patent did not completely separate the oil from the gas and thus, an additional oil separator was required in the condenser.

SUMMARY OF THE INVENTION

The present invention provides a refrigerating apparatus including a compressor and a condenser having an oil separator located therebetween, the oil separator including an inlet pipe and an outlet pipe whereby a mixture of gaseous refrigerant and oil are introduced into the oil separator, and only the gaseous refrigerant is taken from the separator and conducted to the condenser. More specifically, both the inlet and outlet conduits of the oil separator have improved oil separating devices. These devices comprising a layer of asbestos with a layer of screen mesh, the layers being rolled or wound together to form an oil-separating device. One of these devices is located in the end of the pipe which discharges into the separator and the other device is located on the pipe which takes the gaseous refrigerant from the separator and conducts it to the condenser.

The construction of the separating devices is such that the asbestos layers are particularly effective in separating or coalescing the fine droplets of oil and causing them to combine into larger droplets where they can be separated from the device. This asbestos material on the other hand is porous enough to permit the gaseous refrigerant to pass through. The wire mesh screen acts as a channel or path for conducting the oil droplets by gravity out of the device. In effect, the device produces larger droplets of oil which can then be permitted to drain out past the wire mesh which acts as a drain passage.

These and other objects and advantages of the present invention will appear hereinafter as this disclosure progresses, reference being had to the accompanying drawings.

DESCRIPTION OF THE PREFERRED EMBODIMENT

Figure 1:
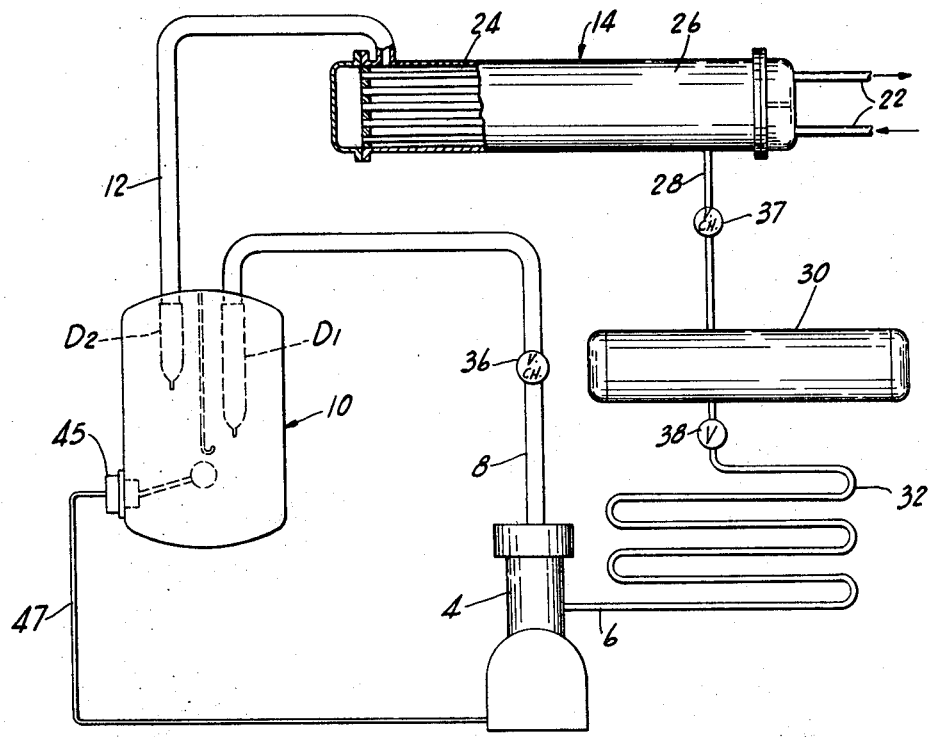
FIG. 1 is a diagrammatic view of a refrigeration system embodying the present invention, certain parts being shown as broken away and in section for the sake of clarity.

The refrigerating system shown in FIG. 1 includes, in general, a compressor 4 having an inlet or suction conduit 6 and an outlet or high-pressure discharge line 8 which leads to an oil separator 10. The refrigerant containing a certain amount of entrained oil is conducted through the discharge line 8 into the oil separator, and the oil separator then completely separates the oil from the refrigerant by means to be described. The clean gaseous refrigerant is then conducted by line 12 to a condenser 14. This condenser may be of the shell and tube type in which cooling water is supplied to conduits 22 and is circulated through a plurality of tubes 24 located in the shell 26 of the condenser. A conduit 28 conducts liquid from the condenser 10 and to the receiver 30 and then the refrigerant is passed through a evaporator or cooling coil 32 for ultimate return to the compressor. The above-described refrigerating circuit is conventional including the general position of the oil separator between the compressor and condenser.

Suitable valves are also of course, included in the circuit and these may include a known return check valve 36 in line 8, a similar check valve 37 in the line between the condenser and receiver, and a conventional expansion valve 38 in the inlet to the evaporator.

The oil separator also includes a float valve 45 and thus the level of the oil in the bottom of the separator is controlled by the float valve, the latter of which permits the oil to flow through conduit 47 back to the crankcase section of the compressor.

Referring now specifically to the oil separator devices D1 and D2 located in the oil separator, it will be noted that one device D1 is located on the end of line 8 which discharges into the oil separator, and the other oil separator device D2 is located on the end of the conduit 12 which conducts the gaseous refrigerant from the oil separator to the condenser. Thus, the mixture of refrigerant and oil are introduced into the oil separator and must pass through oil separator device D1 at which time a considerable amount of oil is separated from the gas and collects in the bottom of the oil separator. The other separator device D2 is located at a higher elevation within the separator and receives the gaseous refrigerant and also a certain amount of oil which has not been separated therefrom. The oil separator device D2 is effective to remove the remaining oil from the gaseous refrigerant and the clean gaseous refrigerant then passes to the condenser.

The specific construction of the oil separator devices D1 and D2 are similar and only one will be referred to, although the device D2 is shown as being shorter.

Figure 2:
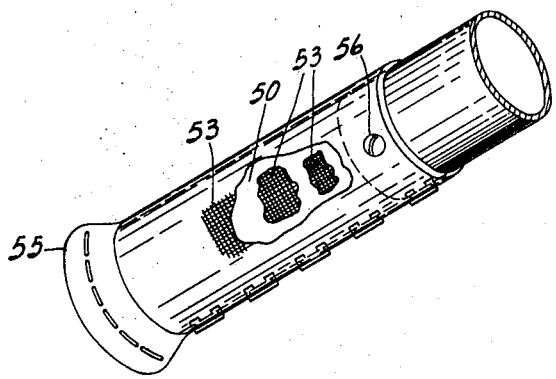
FIG. 2 is a perspective view of one of the oil-separating devices which is used in the oil separator shown in FIG. 1.
Figure 3:
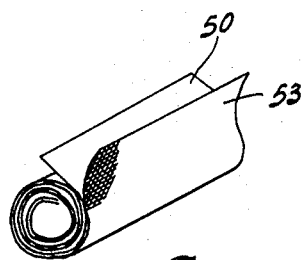
FIG. 3 is a perspective view of a partially assembled device which is shown in FIG. 2.

As shown in FIG. 2, the devices include a layer of asbestos cloth 50 and a layer of wire mesh screen 53 and these layers are then rolled or wound together and then stapled together to form a cylinder having a closed end 55, and the other end of which is slipped over the conduits 8 and 12 and removably secured thereto by a drive screw 56. In the specific example shown, the two layers 50 and 53 are wound together to form three double layers of material, but other numbers of layers may be used.

In regard to the wire mesh material 53, a 40×36 mesh of tinned steel wire of a 0.0095-inch diameter has proved to be desirable.

The asbestos cloth material is preferably an 8 warp and 8 filler ends per inch weave, which is commonly measured as being 0.055 inch thick.

In operation, as the gas and oil pass through the device, the asbestos acts to coalesce fine droplets of oil and causes them to collect into larger droplets to a condition where they fall out and collect in the wire mesh screen. The asbestos material is sufficiently porous however, for the gaseous refrigerant to pass therethrough. Furthermore, the asbestos material operates satisfactorily at higher temperatures which are encountered with discharge gas vapor.

The vertically disposed cylinder, and particularly the wire mesh screen forms a path or a channel through which the oil that has been separated from the gas can drain downwardly by gravity and finally dropped from the device and into the collection of oil at the bottom of the separator.

The wire mesh screen serves another function, namely to act as a support for the fibrous asbestos material and thus holds the fibrous asbestos material in position because it is otherwise incapable of supporting itself.

By means of the present oil-separating devices, it is possible to screen out the larger droplets that are ultimately formed and conduct them by gravity from the separator devices.

The combination of asbestos material together with a layer or layers of wire screens serve as a separating means for the oil and adds to the ability of the wire screen material to also separate the oil. The asbestos material which is of a rather close weave as compared to the wire mesh material provides a good means of separating the fine droplets and mist of the oil from the gas stream.

The screen material, which is coarser than the asbestos material, provides a path in the vertical direction through which the accumulated oil from each layer of asbestos can run downwardly to the bottom of the separating devices and then collect in sufficiently large drops so they will ultimately fall to the bottom of the oil separator.

I claim:

1. An oil separator for a refrigerating system and having a refrigerant inlet and outlet, an oil-separating device located on said inlet and an oil-separating device located on said outlet, each of said devices comprising, an asbestos layer and a layer of wire mesh screen rolled up together to form a cylinder, said cylinders having a closed end and an open end, said cylinders being vertically disposed and having their open end in communication with the respective inlet and outlet, whereby droplets of oil coalesced by said asbestos layers run down the wire mesh where they fall from said separating devices.

2. The separator set forth in claim 1 wherein said asbestos is of a cloth having approximately an 8 warp and 8 filler ends per inch, and said wire mesh screen is of approximately a 40×36 mesh of tinned steel wire of a 0.0095-inch diameter.

3. In a refrigerating system having a compressor, a condenser for delivering refrigerant to said compressor, and an oil separator between said condenser and compressor and having a refrigerant inlet and outlet, an oil-separating device located on said inlet and an oil-separating device located on said outlet, each of said devices comprising, an asbestos layer and a layer of wire mesh screen rolled up together to form a cylinder, said cylinders having a closed end and an open end, said cylinders being vertically disposed and having their open end in communication with the respective inlet and outlet, whereby droplets of oil coalesced by said asbestos layers run down the wire mesh where they fall from said separating devices.

4. The separator set forth in claim 3 wherein said asbestos is of a cloth having approximately an 8 warp and 8 filler ends per inch, and said wire mesh screen is of approximately a 40×36 mesh of tinned steel wire of a 0.0095-inch diameter.

5. An oil separator for a refrigerating system and having a refrigerant line entering therein, an oil-separating device located on said line and comprising, an asbestos layer and a layer of wire mesh screen rolled up together to form a cylinder, said cylinder having a closed end and an open end, said cylinder being vertically disposed and having its open end in communication with said line, whereby droplets of oil coalesced by said asbestos layers run down the wire mesh where they fall from said separating device.

6. The separator set forth in claim 5 wherein said asbestos is of a cloth having approximately an 8 warp and 8 filler ends per inch, and said wire mesh screen is of approximately a 40×36 mesh of tinned steel wire of a 0.0095-inch diameter.